United States Patent [19]
Masutani et al.

[11] Patent Number: 5,651,741
[45] Date of Patent: Jul. 29, 1997

[54] GOLF BALL

[75] Inventors: Yutaka Masutani; Keisuke Ihara; Seisuke Tomita, all of Saitama, Japan

[73] Assignee: Bridgestone Sports Co., Ltd., Tokyo, Japan

[21] Appl. No.: 644,981

[22] Filed: May 9, 1996

[30] Foreign Application Priority Data

May 15, 1995 [JP] Japan .................................. 7-139903
Jan. 5, 1996 [JP] Japan .................................. 8-134402

[51] Int. Cl.⁶ .......................... A63B 69/36; A63B 37/14
[52] U.S. Cl. ............................ 473/200; 473/353; 40/327
[58] Field of Search ............................ 473/242, 268, 473/200, 353; 40/327

[56] References Cited

U.S. PATENT DOCUMENTS 4,235,441  11/1980  Ciccarello ................. 473/268 X
5,433,446  7/1995   Lindstedt .................. 473/242

Primary Examiner—George J. Marlo
Attorney, Agent, or Firm—Sughrue, Mion, Zinn, Macpeak & Seas

[57] ABSTRACT

A golf ball is provided with a marking portion including a hologram implementing a color and/or pattern produced by optical interference. The marking portion is provided on the entire surface of the golf ball or only in dimples. The marking portion including a hologram reflects light and thereby glitters, and is visually recognized as a three-dimensional image, thereby improving visibility of the ball from a distance. The marking portion including a hologram allows an image to be readily reproduced by irradiating a laser beam thereto. Thus reproduced image facilitates an automated inspection for the appearance of the marking portion.

18 Claims, 3 Drawing Sheets

GOLF BALL

BACKGROUND OF THE INVENTION (a) Field of the Invention

The present invention relates to a golf ball having a novel marking portion on the surface thereof.

(b) Description of the Related Art

The surface of a golf ball typically bears a marking such as a trademark, a number and a character. Conventional markings are made generally using paint. For example, in thread-wound golf balls, after a rubber thread-wound ball is enclosed in a cover and the cover is dimpled, a marking is made on the cover surface by using paint. A clear coat is subsequently applied onto the marked cover surface. In two-piece golf balls, after a core is enclosed in a cover and the cover is dimpled, a marking is made on the cover surface by using paint, then a clear coat is applied onto the marked cover surface.

The conventional golf balls having a paint-made marking thereon have the following drawbacks.

(1) During golf play, the rule of the game requires that each player hole out at a hole through using a single ball, which he played from the tee of the hole, i.e. ball in play. If he plays a ball other than the ball in play, he incurs a penalty for playing the wrong ball. A trademark and a number stamped on a ball are usually utilized to identify the ball in play. When the ball in play and another ball have different trademarks, these trademarks are used to distinguish the balls from each other. When the ball have the same trademark, the numbers are used to distinguish the bails from each other.

During golf play, after a player makes a shot, he walks toward a spot where he expects to find his ball. Since paint-made markings on conventional golf balls do not reflect light well or glitter, it is difficult for a player to visually recognize his ball or markings thereon from a distance. He, therefore, must bring his face closer to a ball so as to identify his ball. If he fails to identify markings on the ball before making his shot, he is likely to play the wrong ball. When a ball enters a zone outside a fairway, i.e. rough or out of bounds, it often takes a long time for a player to find his ball and the ball is likely to be lost.

(2) During a final test in the manufacture of golf balls, finished balls are examined for weight, hardness, diameter, overall shape, shape of dimples, appearance and the like. Only those balls which have passed the test are delivered. During the appearance test of a marking on the ball, an inspector visually checks whether a trademark, a number and a character are properly and completely stamped on the golf ball surface. This involves potential variations in test results due to differences in his skill levels and his physical and mental conditions.

SUMMARY OF THE INVENTION

In view of the foregoing, an object of the present invention is to provide a golf ball which allows a player to visually recognize a marking thereon from a distance and facilitate an automated inspection for the appearance of the marking.

To achieve the above object, the inventors carried out earnest studies and found that when a marking on the golf ball surface takes the form of a hologram, which is a kind of color and/or pattern produced by optical interference, the marking reflects light and hence glitters. Further, the marking can be visually recognized as a three-dimensional image and thus is far easier to recognize from a distance. When the marking portion formed of a hologram is irradiated by, for example, a laser beam, the image for the marking is readily reproduced. This reproduced image is useful in an automated inspection for the appearance of the marking during a final test. A color and/or pattern produced by optical interference other than a hologram also provides similar function and effects. The present invention is based on these findings.

Accordingly the present invention provides a golf ball having a marking portion which is provided on the surface of the golf ball and implements a color and/or pattern produced by optical interference.

The marking portion may be provided on the entire surface of the golf ball. Alternatively, the marking portion may be provided only in part or in all of dimples.

Preferably, a mark and/or a number are formed by the marking portion. Preferably, the marking portion includes a hologram.

The marking portion including a hologram reflects light and glitters, and is visually recognized as a three-dimensional image. This feature provides excellent visibility from a distance compared to a conventional marking portion. Accordingly, the marking portion including a hologram on the golf ball surface improves the visibility of the golf ball itself from a distance.

When a mark and/or a number is formed by a marking portion including a hologram, the visibility of the mark and/or the number from a distance can be improved. Hence, the use of the golf ball according to the present invention effectively prevents a player from playing the wrong ball due to failure to identify the ball in play, from taking a long time to find his ball, and from losing his ball.

When the marking portion is formed of a metal thin film on which a hologram is recorded, the reflected ray of the marking portion is recognized as having a different color from sunlight. This feature provides excellent visibility from a distance, compared to a marking portion formed of a ordinary metal thin film.

An image can be readily reproduced from the marking portion including a hologram by irradiating the marking portion by, for example, a laser beam. The use of the thus reproduced image facilitate an automated inspection for the appearance of the marking portion including the hologram.

The marking portion including a hologram glitters and is visually recognized as a three-dimensional image, so that it adds an attractive property to the appearance of a golf ball.

Effects similar to those of the hologram are obtained from a color and/or pattern produced by optical interference other than a hologram, for example, from a marking portion formed by etching or a marking portion formed by irradiation of a laser beam to a transparent layer on the golf ball surface.

The above and other objects, features and advantages of the present invention will be more apparent from the following description.

PREFERRED EMBODIMENTS OF THE INVENTION

The marking portion of the present invention is applicable to any kind of golf balls including thread-wound balls, two-piece balls, and one-piece balls.

A hologram may be recorded in the marking portion for implementing a color and/or pattern produced by optical interference according to the present invention. The hologram is an image generally recorded on a recording material by means of holography. Holography is a generic term for methods of recording and reproducing a signal wave emitted from an object by utilizing coherence of light and other wave motions, and other techniques using the methods.

The hologram as used in an embodiment of the present invention is formed, for example, by recording the intensity distribution of interference fringes on a recording material, the interference fringes being generated by interference effected by superimposing a wave front reflected from or transmitted through an object with a reference wave front.

Any type of holograms can be used for forming the marking portion. Holograms are classified into Fresnel holograms, Fourier-transform holograms and the like according to types of diffracted waves of objects. Plane holograms, volume holograms and the like can be produced by selecting relevant photosensitive materials for recording. Also available are computer holograms in which a signal wave is obtained using a computer. It is possible to apply any of the holograms as described above to the present invention.

For better visual recognition from a distance, it is preferable that when the marking portion including a hologram is irradiated by light, particularly sunlight, it reflects the light well and thereby glitters. There is no substantial restriction on the thickness of the hologram. However, a thinner structure of the marking portion is desirable so as not to influence the performance of the ball. A plane hologram is preferable accordingly. The marking portion including a hologram may be formed of a metal thin film on which a hologram is recorded. There is also no substantial restriction on the shape and content of the marking portion including the hologram.

No substantial restrictions are imposed on the manner for implementing the marking portion provided on the surface of a golf ball and including a hologram. For example, the following embodiments may be mentioned.

Figure 1:
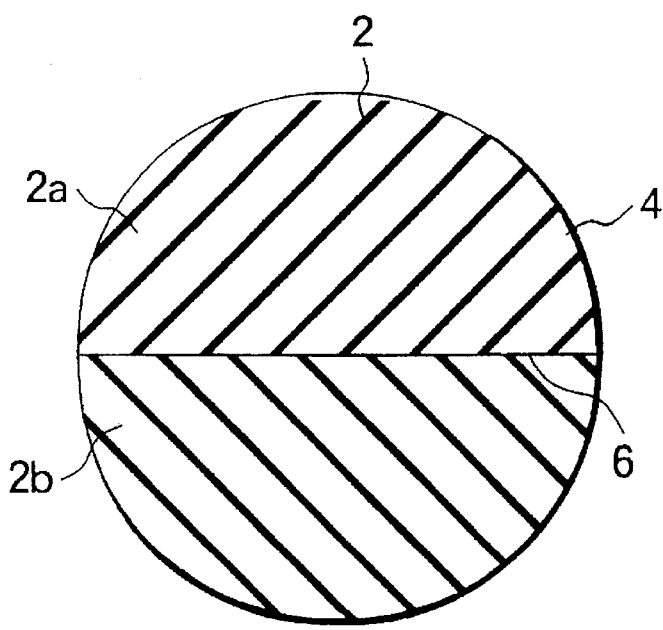
FIG. 1 is a front view of a golf ball according to an embodiment of the present invention.

(1) The marking portion including a hologram covers the entire surface of a golf ball (Embodiment shown in FIG. 1).

In this case, a golf ball is provided which has particularly excellent visibility of the ball itself from a distance. When the marking portion includes a mark and a number, their visibility from a distance is improved.

Figure 2:
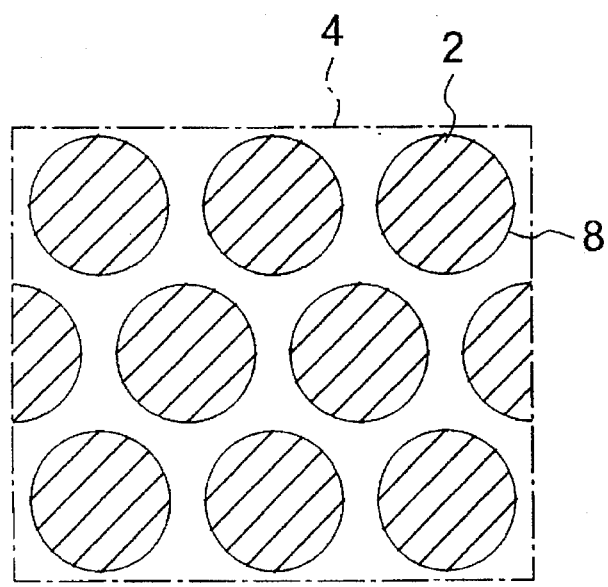
FIG. 2 is an enlarged view of dimples forming a marking portion of a golf ball according to another embodiment of the present invention.

(2) The marking portion including a hologram is provided in part or all of dimples (Embodiment shown in FIG. 2).

In this case, a golf ball is provided which has an excellent visibility of the ball itself from a distance. Preferably, most or all of the dimples 8 are formed as the marking portion including the hologram.

(3) The marking portion including a hologram is provided on the portion of a golf ball other than dimples.

In this case, a golf ball is provided which has an excellent visibility of the ball itself from a distance.

Figure 3:
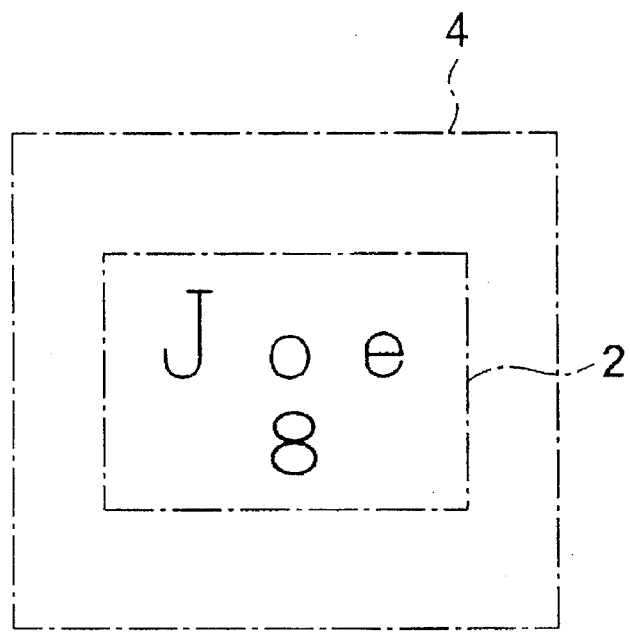
FIG. 3 is an enlarged view of a marking portion of a golf ball according to a still another embodiment of the present invention.
Figure 4:
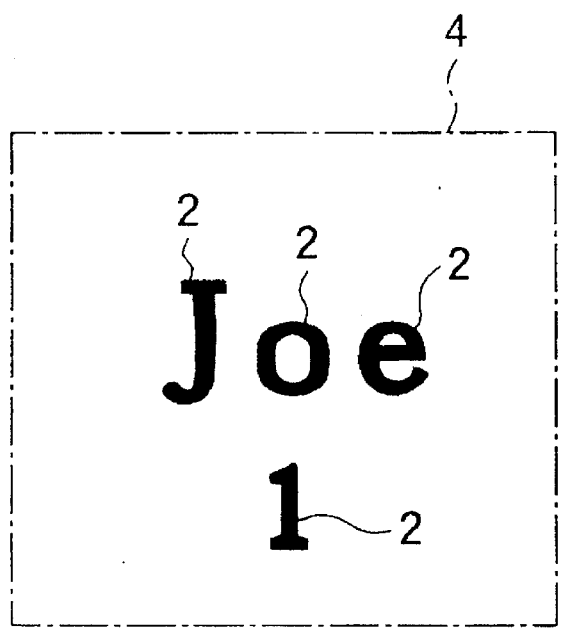
FIG. 4 is an enlarged view of a marking portion of a golf ball according to a still another embodiment of the present invention.

(4) Either or both of a mark and a number are formed as a marking portion including a hologram (Embodiments shown in FIGS. 3 and 4).

In this case, a golf ball is provided which has a particularly excellent visibility of a mark and/or a number from a distance. The visibility of the ball itself from a distance is also improved (5) The marking portion including a hologram having an arbitrary shape 2 is provided on the golf ball surface at an arbitrary position (Embodiment shown in FIG. 5).

In accordance with any one of the embodiments of the present invention, it is possible to carry out an automated appearance inspection for the marking portion including the hologram by using a reproduced image of the marking portion. It is also possible to carry out an automated inspection for the shape of balls and dimples, etc. by using the reproduced image.

There are no substantial restrictions on means for forming a marking portion including a hologram on the golf ball surface. A film or a deposited metal foil bearing a hologram may be stuck to the golf ball surface at the marking position. Alternatively, a hologram may be directly recorded on the golf ball surface at the marking position. In the latter case, a layer of hologram recording material such as photosensitive material used for a photography is previously formed on the golf ball surface at the marking portion, and then a hologram is recorded on the layer by irradiating a laser, for example. Instead, a hologram may be transferred onto the golf ball surface at the marking portion by using a molding die for transferring the hologram.

It is sufficient that the marking portion including a hologram is visually recognized. Accordingly, the marking portion may be provided on the cover surface of a ball located underneath a clear coat layer or on the surface of a clear coat. However, a golf ball having the marking portion provided on the cover surface is preferable because the marking portion is less likely to be damaged. The marking portion including the hologram may be formed on the cover surface before or after forming dimples.

Alternatively, the marking portion for implementing a color and/or pattern produced by optical interference may be formed using an etching technique. For example, fine depressions and protrusions of a submicron order are formed on the inner surface of a molding die for the cover of golf balls, and the depressions and protrusions are transferred onto the cover surface of each golf ball. The processed golf ball is then coated with a clear coat. The resultant depressions and protrusions on the golf ball generate an optical interference, which causes a color and/or pattern to emerge on the golf ball surface. Examples of etching technique applicable to the method as described above includes laser etching, chemical etching, and photoresist etching.

The marking portion for implementing a color and/or pattern produced by optical interference may be formed by irradiating a transparent layer of the golf ball surface by a laser beam. For example, a clear coat, a transparent film layer or the like is provided on the surface of a golf ball, and then the transparent layer is partially irradiated by a laser beam to change the quality of the irradiated portion of the transparent layer. The irradiated portion of the transparent layer and the remaining portion have different transmittances and transmission depths for light, generating a color and/or pattern on the golf ball surface due to optical interference.

It is desirable that the marking portion formed by use of etching or the marking portion formed by irradiating a transparent layer on the golf ball surface by a laser beam glitters markedly when irradiated by light, particularly by sunlight. The manner for providing these marking portions on a golf ball is similar to those of the marking portions including a hologram, i.e. the manners (1) to (5) as described before.

Practical examples of golf balls according to preferred embodiments of the present invention will be now described in more detail with reference to the accompanying drawings as mentioned before.

Referring to FIG. 1, the entire surface of a golf ball 4 is provided with a marking portion 2 including a hologram for implementing a color and/or pattern produced by optical interference. Dimples are not shown in FIG. 1 for simplification purpose. In the golf ball according to the present embodiment, the marking portion 2 has different patterns in directions between the upper semispheric surface 2a and the lower semispheric surface 2b. The marking portion 2 also includes another holographic marking including a mark and a number, not shown.

A golf ball according to the present embodiment has an excellent visibility of the ball itself from a distance and a superior visibility of a mark and a number from a distance. A boundary line 6 between a first marking portion 2a on the upper semispheric surface and a second marking portion 2b on the lower semispheric surface helps a player set his ball in alignment with a putting line and also helps him check how the ball rolls during the putting.

In a golf ball 4 of FIG. 2, a marking portion 2 including a hologram is provided only in each dimple 8. In the present embodiment, the marking portion 2 is provided in all dimples 8. However, it is not necessary to provide marking portion in all of the dimples. The golf ball according to the embodiment has an excellent visibility of the ball itself from a distance.

In a golf ball 4 of FIG. 3, a marking portion 2 is formed of a rectangular hologram containing a mark and a number (dimples are not shown for simplification). The golf ball according to the embodiment has excellent visibility of a mark and a number from a distance and a superior visibility of the ball itself from a distance.

In a golf ball 4 of FIG. 4, each marking portion 2 is formed in a character for showing a mark or number, which is implemented by each hologram. The golf ball according to the present embodiment has excellent visibility of a mark and a number from a distance and a superior visibility of a ball itself from a distance.

Figure 5:
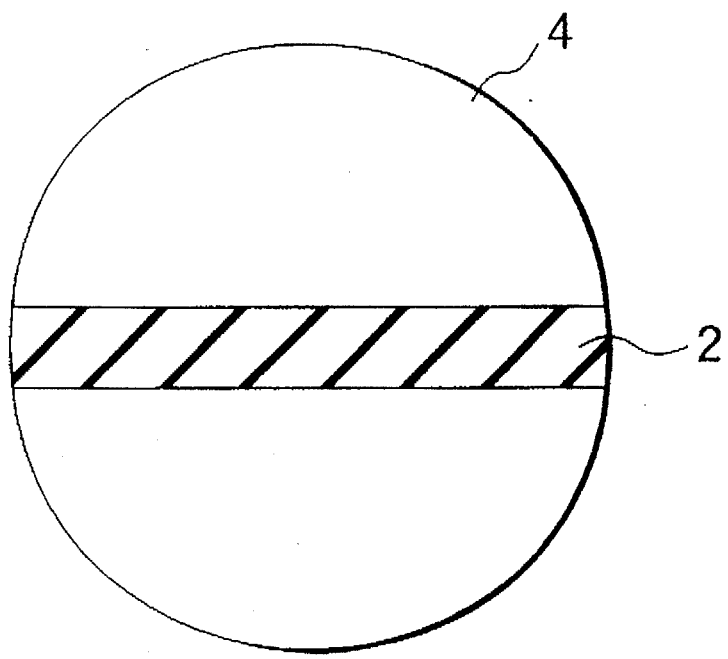
FIG. 5 is a front view of a golf ball according to a still another embodiment of the present invention.

In a golf ball 5 of FIG. 5, a marking portion 2 is formed of a strip region including a hologram extending along the boundary line between an upper semispheric surface and a lower semispheric surface (dimples are not shown). The golf ball according to the present embodiment has excellent visibility of the ball itself from a distance. The stripe marking portion 2 helps a player set his ball in alignment with a putting line and also helps him check how the ball rolls during the putting.

The golf balls of FIGS. 2 and 5 may employ a holographic marking of the mark and the number as shown in FIGS. 3 and 4. This improves the visibility of the mark and the number from a distance for the balls of FIGS. 2 and 5. Also, a marking portion for implementing a color and/or pattern produced by optical interference may be formed by utilizing etching or irradiating a transparent layer on the golf ball surface by a laser beam.

Since above embodiments are described only for the purpose of example, the present invention is not limited to such embodiments and it will be obvious for those skilled in the art that various modifications or alterations can be easily made based on the above embodiments within the scope of the present invention.

We claim:

1. A golf ball comprising; a ball body having a spheric surface with dimples therein, at least one marking portion provided on said spheric surface, said marking portion comprising a thin film having a color and/or pattern produced by optical interference, and being formed by holographic recording.

2. A golf ball as defined in claim 1, wherein said marking portion is provided on the entire spheric surface.

3. A golf ball as defined in claim 1, wherein said spheric surface said marking portion is provided in at least portion of said dimples.

4. A golf ball as defined in claim 1, wherein a character is formed by said marking portion.

5. A golf ball as defined in claim 1, wherein said marking portion includes a first marking portion formed in a first semispheric surface of said spheric surface and a second marking portion formed in a second semispheric surface of said spheric surface.

6. A golf ball as defined in claim 1, wherein said marking portion is formed in a stripe region.

7. A golf ball comprising; a ball body having a spheric cover surface with dimples therein, and at least one marking portion provided on said spheric surface, said marking portion having a color and/or pattern produced by optical interference, and said marking portion having fine depressions and protrusions formed by transfer from an inner surface of a molding die for making the cover of golf ball onto the cover surface of golf ball.

8. A golf ball as defined in claim 7, wherein said marking portion is provided on the entire spheric surface.

9. A golf ball as defined in claim 7, wherein said marking portion is provided in at least a portion of said dimples.

10. A golf ball as defined in claim 7, wherein character is formed by said marking portion.

11. A golf ball as defined in claim 7, wherein said marking portion includes a first marking portion formed in a first semispheric surface of said spheric surface and a second marking portion formed in a second semispheric surface of said spheric surface.

12. A golf ball as defined in claim 7, wherein said marking portion is formed in a stripe region.

13. A golf ball comprising; a ball body having a spheric cover surface with dimples therein and a transparent layer on the spheric surface, at least one marking portion provided on said spheric surface, said marking portion having a color and/or pattern produced by optical interference, and being formed by irradiating the transparent layer with a laser beam.

14. A golf ball as defined in claim 13, wherein said marking portion is provided on the entire spheric surface.

15. A golf ball as defined in claim 13, wherein said marking portion is provided in at least a portion of said dimples.

16. A golf ball as defined in claim 13, wherein a character is formed by said marking portion.

17. A golf ball as defined in claim 13, wherein said marking portion includes a first marking portion formed in a first semispheric surface of said spheric surface and a second marking portion formed in a second semispheric surface of said spheric surface.

18. A golf ball as defined in claim 13, wherein said marking portion is formed in a stripe region.

* * * * *